United States Patent [19]

Gaddy et al.

[11] Patent Number: 4,645,658
[45] Date of Patent: Feb. 24, 1987

[54] METHOD OF RECOVERING HYDROCHLORIC ACID FROM A PRODUCT COMPRISED OF SUGARS AND CONCENTRATED HYDROCHLORIC ACID

[76] Inventors: James L. Gaddy, 964 Arlington Terrace; Edgar C. Clausen, 2425 Sharon St., both of, Fayetteville, Ark. 72701

[21] Appl. No.: 728,918

[22] Filed: Apr. 30, 1985

[51] Int. Cl.$^4$ .......................... C01B 7/08; C13K 1/04
[52] U.S. Cl. ...................................... 423/488; 127/37; 127/46.1
[58] Field of Search .................. 423/488; 127/37, 46.1

[56] References Cited

U.S. PATENT DOCUMENTS 3,870,060 3/1975 Liljenzin et al. .................... 423/488
4,237,110 12/1980 Forster et al. ...................... 423/488

FOREIGN PATENT DOCUMENTS 376322 7/1932 United Kingdom .................. 127/37

Primary Examiner—John Doll
Assistant Examiner—Jeffrey Edwin Russel
Attorney, Agent, or Firm—Dorsey & Whitney

[57] ABSTRACT

A method of recovering concentrated hydrochloric acid from the product obtained from the acid hydrolysis of a cellulose containing material such as biomass. The method involves contacting such product with an extracting solvent, of which a major portion is acetophenone, to separate the product into a hydrochloric acid enriched phase and a hydrochloric acid depleted phase and then separating and recovering the hydrochloric acid from the hydrochloric acid enriched phase.

18 Claims, 3 Drawing Figures

METHOD OF RECOVERING HYDROCHLORIC ACID FROM A PRODUCT COMPRISED OF SUGARS AND CONCENTRATED HYDROCHLORIC ACID

BACKGROUND OF THE INVENTION

The present invention relates generally to a method of recovering hydrochloric acid from a product comprising a mixture of sugars and concentrated hydrochloric acid, and more particularly, to a method of recovering hydrochloric acid from the hydrolyzate product obtained from the acid hydrolysis of biomass.

As a result of the continual depletion of nonrenewable energy sources and the rapid escalation of energy prices, various energy conservation measures have been encouraged and alternative energy sources have been proposed and studied. Among the proposed alternative energy sources are those such as geothermal energy and solar energy, however, current research has focused more and more on the use of biomass as a viable energy source.

Biomass is composed of three major materials: cellulose, hemi-cellulose and lignin in ratios of roughly 4:3:3. This composition enables biomass to be a versatile alternative energy source since cellulose is a polymer of hexose rings and hemi-cellulose is a polymer composed of hexose and pentose rings. These polymer chains may be broken and converted to sugars and other chemicals through various chemical, microbial or fermentation processes.

The principal sources of biomass are agricultural crops, agricultural residues, forest products, municipal waste, raw sewage and manures from confined livestock operations. Biomass is particularly attractive as an alternative energy source since it is available in large quantities and is renewable. It can also be converted to a variety of chemicals and its conversion need not create air pollution problems. Instead, such conversion can assist in alleviating municipal waste problems.

To optimize the conversion of biomass to energy producing compounds and other chemicals, it is necessary to fractionate the crude biomass to the sugar monomers, glucose and xylose. The most common method used in accomplishing this conversion is acid hydrolysis. In general, acid hydrolysis of biomass requires either high temperatures and dilute acid or high acid concentrations and low temperatures to obtain acceptably high sugar yields. The high temperature/dilute acid process has the advantage of not requiring acid recovery, because of the relatively inexpensive dilute acid being utilized. However, such process has the disadvantage of suffering low sugar yields caused by the degradation of sugars at the high temperatures needed.

The high acid concentration/low temperature process has produced reasonably acceptable sugar yields, but economic success of the process requires acid recovery. Accordingly, it is recognized that for the conversion of biomass to sugars and other usable chemicals through the use of concentrated acids to be economically feasible, the process must include an efficient acid recovery procedure. Typically, dilute acid processes involve acid concentrations of 5% or less, while high acid concentration processes involve acid concentrations of 10% or greater.

The traditional approach used in recovering hydrochloric acid is through distillation or evaporation. However, high temperatures associated with distillation cause sugar degradation, thereby lowering yields. Lower temperatures can be achieved by vacuum evaporation conditions, but such a process is energy intensive and costly.

The separation of concentrated hydrochloric acid and glucose is not generally new to the chemical process industry. An early method was the Bergius-Rheinau process for recovering concentrated hydrochloric acid from a composition containing glucose and hydrochloric acid. The fundamental idea behind this sugar-acid separation was evaporation under reduced pressure. Although this vacuum evaporation suppressed sugar degradation, the lack of suitable construction materials made the evaporation difficult. As acid resistant materials were developed, this process was modified by use of a series of vacuum evaporators. The principal drawback of such a system, however, was that the system was not economical and was quite large and complicated. Further, in this process, the recovery was limited as a result of the azeotropic relationship between hydrochloric acid and water.

More recently, a process for separating and recovering concentrated hydrochloric acid from a hydrolyzate solution was the subject of U.S. Pat. No. 4,237,110. The principal idea behind the process described in this patent was to recover concentrated hydrochloric acid by solvent extraction using a $C_5$–$C_9$ alcohol as the extracting solvent. In this process, the solvent is brought into contact with the hydrolyzate resulting in the formation of two phases, a hydrochloric acid enriched solvent phase and an acid depleted hydrolyzate phase. Concentrated hydrochloric acid was then recovered from the solvent phase by distillation. While this method is effective under certain conditions for the recovery of hydrochloric acid, it does have certain disadvantages. One disadvantage is that the alcohols chemically react with the hydrochloric acid during extraction, thus requiring a further step to regenerate the hydrochloric acid and alcohol components before proceeding with further separation.

Accordingly, there is a need in the art for a method of recovering concentrated hydrochloric acid from a sugar/hydrochloric acid product obtained from the acid hydrolysis of biomass or other cellulose based materials. A further need is for a method to recover concentrated hydrochloric acid and still permit subsequent recovery of the sugars.

SUMMARY OF THE INVENTION

In accordance with the present invention, concentrated hydrochloric acid can be recovered from the glucose/hydrochloric acid composition obtained from the acid hydrolysis of biomass through a procedure involving solvent extraction. Specifically, the process of the present invention involves contacting the hydrolyzate solution obtained from the acid hydrolysis with acetophenone ($C_6H_5COCH_3$), or other solvent in which acetophenone is a major component, in an extraction column. This results in the separation of the hydrolyzate into an acid-rich extract phase and a glucose-rich raffinate phase. In accordance with the preferred procedure, these two components are then further processed by passing the acid-rich extract through an atmospheric evaporator and passing the glucose-rich raffinate through a vacuum evaporator. The outputs from these respective evaporators are then further exposed to a mixer/settler to further separate the solvent from the hydrochloric acid and the solvent from the sugars, respectively. After recovering the concentrated hydrochloric acid, it is recycled for use in the acid hydrolysis of biomass. The recovered solvent is also recycled for further use in the extraction column. The acetophenone-rich solvent is effective to extract the HCl while simultaneously leaving the sugars behind to permit their ultimate recovery.

DESCRIPTION OF THE PREFERRED METHOD

While the preferred method of the present invention has application to any procedure in which it is desired to recover concentrated hydrochloric acid from a composition of concentrated hydrochloric acid and sugars, it has particular application in a process for recovering concentrated hydrochloric acid from the hydrolyzate product of the acid hydrolysis of biomass. There are a number of methods utilized in the acid hydrolysis of biomass or other cellulose containing materials for producing a hydrolyzate having a composition of sugars, water and concentrated hydrochloric acid. One such acid hydrolysis procedure is described in U.S. Pat. No. 4,237,110.

In a typical process involving the acid hydrolysis of biomass using concentrated hydrochloric acid, the acid concentration is generally about 20% or greater. The method of the present invention is applicable to these concentrations of hydrochloric acid and additionally, is applicable for the recovery of hydrochloric acid as low as about 10%. Thus, for purposes of the present method, a concentrated acid will be considered as any concentration greater than about 10%.

Figure 1:
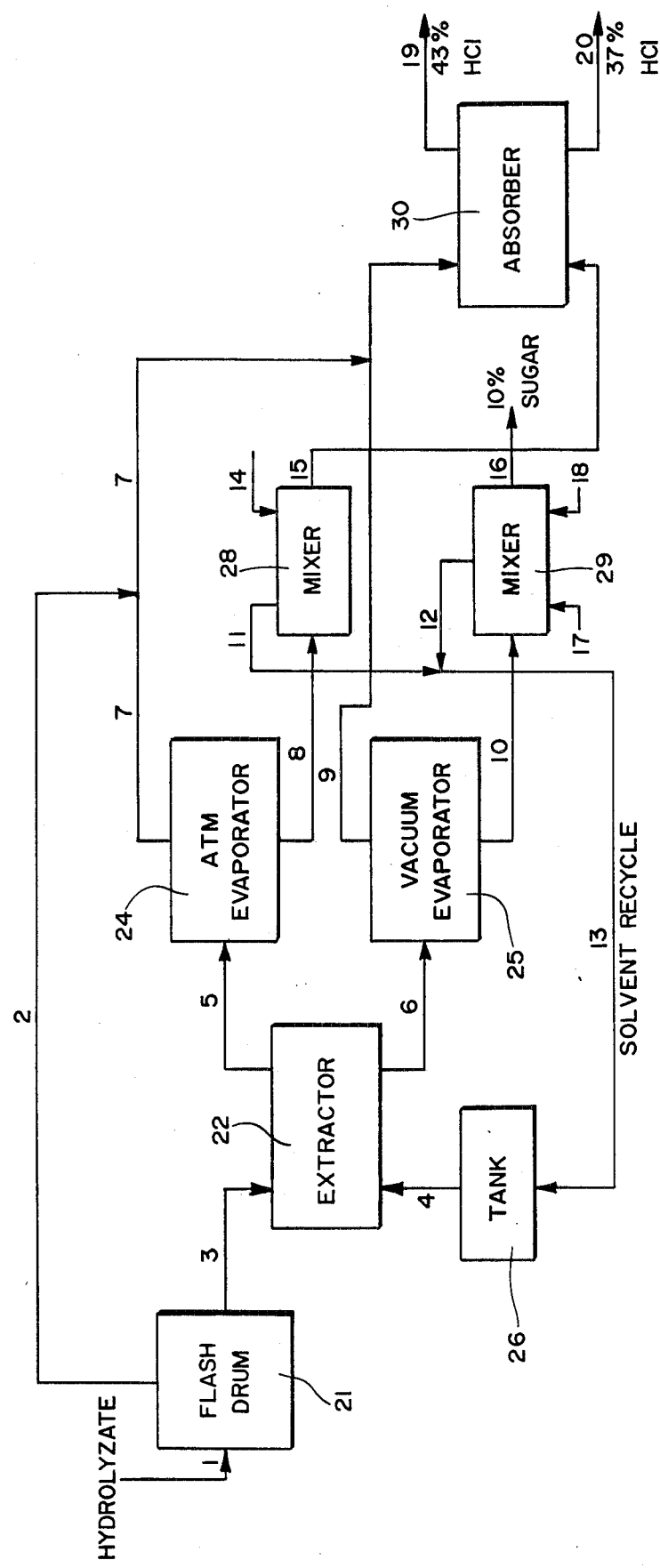
FIG. 1 is a schematic diagram of the solvent extraction acid recovery process in accordance with the present invention.

With reference to the schematic diagram illustrated in FIG. 1, the preferred procedure involves first exposing the hydrolyzate provided via stream 1 to a flash drum 21 for the purpose of removing hydrogen chloride (HCl) in excess of 37% on a glucose-free basis. The hydrolyzate which is the product of the acid hydrolysis of biomass and which enters the flash drum 21 is a composition containing primarily HCl, sugars in the form of glucose and xylose and water. The percentage of each of these compositions will depend upon the concentration of acid utilized in the acid hydrolysis procedure and also on the efficiency of such procedure in converting cellulose and related materials to sugars. Normally, however, it is contemplated that the hydrolyzate stream 1 will contain a sugar component between 5% and 20%. It is also contemplated that the concentration of HCl in this hydrolyzate will be between about 20% and 45% on a glucose-free basis, although it is possible for the HCl concentrations to be outside this range. To the extent the concentration of HCl in the hydrolyzate stream 1 is greater than 37%, exposure to the flash drum 21 at atmospheric pressure and approximately room temperature will result in the excess being flashed off as HCl gas. This HCl is removed from the flash drum 21 through the stream 2 and ultimately directed to the absorption column 30 to be processed in the manner which will be described in greater detail below. For purposes of describing the preferred method, stream 1 contains 40% HCl (43% on a sugar-free basis), 5% water and 9% sugars.

The liquid which is not removed in the flash drum 21 is directed via stream 3 to a countercurrent solvent extraction column 22 where the remaining hydrolyzate is extracted with acetophenone ($C_6H_5OCH_3$) or other solvent in which acetophenone is a major component. The hydrolyzate solution which is provided to the extraction column 22 through stream 3 contains 37% by weight HCl on a glucose or sugar-free basis together with portions of sugars (glucose, xylose or both) and water. Normally the sugar concentration will be expected to be between 5% and 20% by weight. In the preferred system, however, stream 3 will contain 57% water and 10% sugars.

In the extraction column the HCl will be preferentially extracted from the glucose/water solution. In the procedure of the present invention, it is contemplated that the extraction column 22 can be any conventional extraction column, either countercurrent or co-current. However, a countercurrent column is preferred. The column 22 must be constructed of materials which are resistant to the acid environment of the materials which will come in contact with the column. An acceptable extraction column is a Karr extraction column.

In the extraction column 22, the hydrolyzate is fed from the top through the stream 3 while the extraction solvent is fed into the bottom through the stream 4 so that the two streams pass through the extraction column 22 countercurrently. During exposure and mixing of these two streams in the column 22, HCl is preferentially extracted by the solvent and exits from the column 22 in an acid-rich extract phase overhead through stream 5. A glucose-rich raffinate phase is removed below from the extraction column 22 through the stream 6.

It should be noted that in the preferred procedure, the extraction column 22 is operated at atmospheric pressure and at temperatures slightly above room temperature (i.e. 25°–35° C.). It is contemplated, however, that the procedure can be carried out at other temperatures and pressures as well. As with any extraction process, the efficiency of the extracting procedure can normally be increased by increasing the number of stages in the extraction column. Although an extraction column with any number of stages will be effective to obtain the benefits of the present invention, an extraction column having 10 to 20 stages is preferred.

Figure 2:
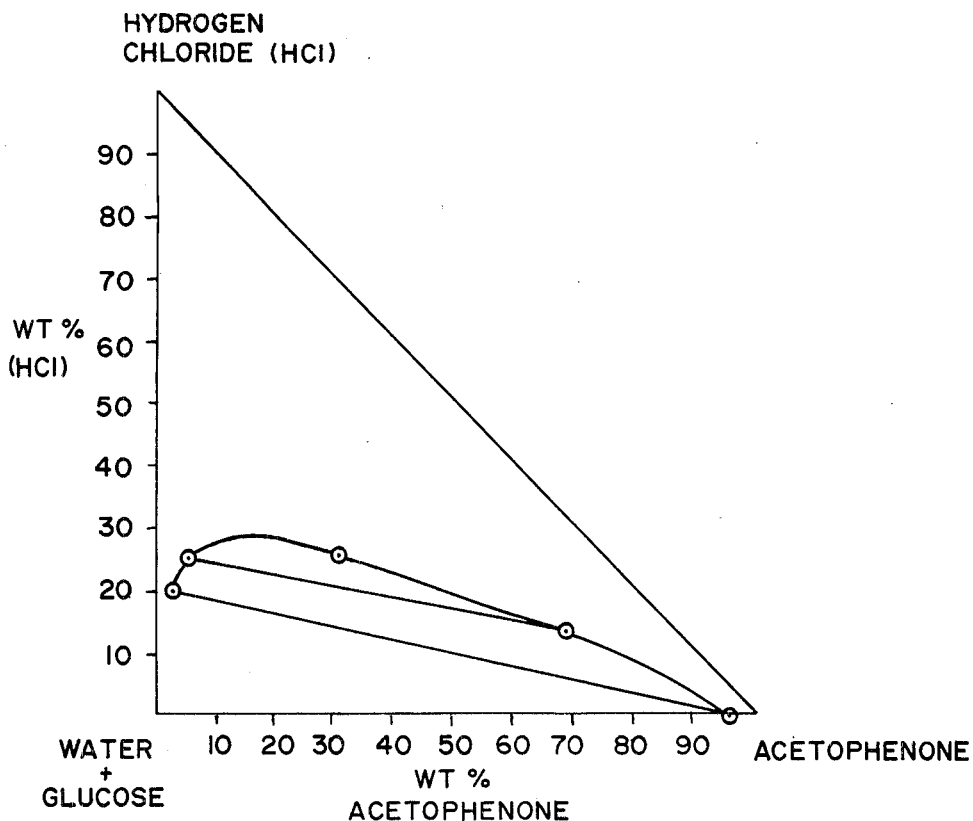
FIG. 2 is a pseudo-ternary diagram showing the phase behavior for a 10% glucose hydrolyzate solution extracted with acetophenone.
Figure 3:
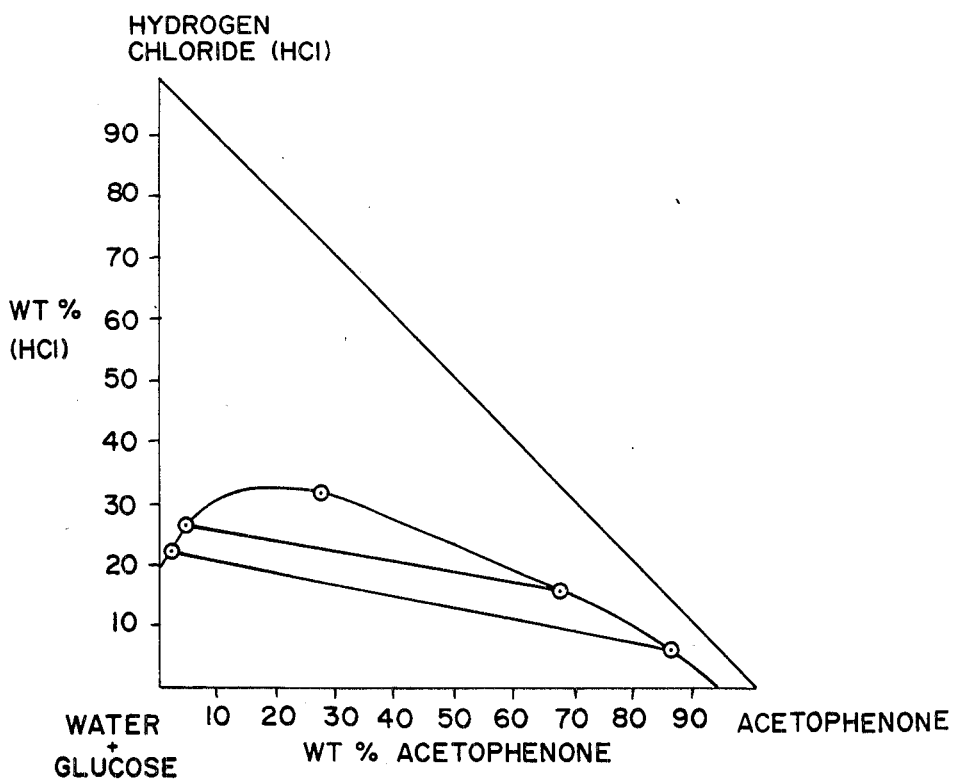
FIG. 3 is a pseudo-ternary diagram showing the phase behavior for a 20% glucose hydrolyzate solution extracted with acetophenone.

The phase behavior of the hydrolyzate when extracted with acetophenone or an acetophenone-rich solvent is determined by the ability of the extracting solvent to preferentially extract HCl from the hydrolyzate. A common way of obtaining information regarding this ability is by developing phase equilibrium data for the system and displaying such data in a ternary phase diagram. Two such ternary diagrams were developed for use in studying the phase behavior of the hydrolyzate and various concentrations of acetophenone. These two ternary phase diagrams were developed for a 10% and a 20% glucose hydrolyzate solution and are illustrated in FIGS. 2 and 3, respectively. The data for these curves was experimentally obtained by evaluating the composition of the two phases of a plurality of hydrolyzate/acetophenone combinations using a single stage contact device.

In the experimental procedure, approximately 30 milliliters of a synthetic hydrolyzate solution was brought into contact with various amounts of the extracting solvent, acetophenone, and then shaken vigorously in a separatory funnel for one hour. The mixture was then allowed to separate into two equilibrium phases, the top being the extract phase and the bottom being the raffinate phase. A sample was extracted from each phase for component analysis. In the experimental procedure, the HCl concentration was measured by titration, the glucose concentration was determined using an industrial glucose analyzer from the Yellow Springs Instrument Company, YSI Model 27 and the acetophenone concentration was determined through absorption spectroscopy. Using this data, which is summarized in Tables 1 and 2 below, the phase behavior diagrams of FIGS. 2 and 3, respectively, were prepared:

TABLE 1

10% Glucose Hydrolyzate Solution
A = Water + Glucose, B = HCl, S = Acetophenone

| Extract Phase | | | Raffinate Phase | | |
|---|---|---|---|---|---|
| A | B | S | A | B | S |
| 77.3 | 20.3 | 2.4 | 3.3 | 0.7 | 96.0 |
| 74.4 | 22.6 | 3.0 | 4.4 | 2.9 | 92.7 |
| 68.9 | 25.5 | 5.6 | 17.0 | 13.8 | 79.2 |
| 63.5 | 27.3 | 9.2 | 22.6 | 18.5 | 58.9 |

TABLE 2

20% Glucose Hydrolyzate Solution
A = Water + Glucose, B = HCl, S = Acetophenone

| Extract Phase | | | Raffinate Phase | | |
|---|---|---|---|---|---|
| A | B | S | A | B | S |
| 75.4 | 22.1 | 2.5 | 7.9 | 5.9 | 86.2 |
| 72.8 | 23.8 | 3.4 | 12.4 | 11.0 | 76.6 |
| 68.9 | 26.1 | 5.0 | 16.2 | 16.2 | 65.6 |

In addition to acetophenone, other solvent systems containing acetophenone as a major component may be used as well. For example, acetophenone has been combined with various concentrations of alcohols and salts, with the resulting mixtures showing effectiveness as extracting solvents in the process of the present invention. For some such mixtures, the effectiveness as an extracting solvent in the present procedure is enhanced. Included in these other solvent systems are mixtures of acetophenone and one or more of the following: isobutanol, n-amyl alcohol, hexanol, heptanol, sodium chloride (NaCl), ammonium chloride (NH$_4$Cl), calcium chloride (CaCl$_2$), lithium chloride (LiCl), sodium sulfate (Na$_2$SO$_4$), zinc chloride (ZnCl$_2$) and ferrous chloride (FeCl$_2$). Although it is contemplated that the above and other alcohols and salts can be present and effective in various concentrations, the acetophenone must constitute a major portion of the extracting solvent system. Accordingly, the extracting solvent system should have an acetophenone concentration of at least 50% and preferably at least 75%.

In the preferred procedure, the acid-rich stream 5 leaving the extraction column 22 overhead has a composition of approximately 15% HCl, 17% water, 2% sugars and 66% acetophenone or other solvent. This stream 5 is directed to an atmospheric evaporator or distillation column 24 for the purpose of separating the HCl from the other components of stream 5. As indicated above, these other components consist primarily of acetophenone or other solvent. This is accomplished with a conventional evaporator or distillation column 24 which, in accordance with the preferred procedure, is operated at atmospheric pressure and at a temperature of approximately 100° C. As with the various other components in the system, the atmospheric evaporator is a standard evaporator or distillation column which exists in the art. The distillate from the evaporator 24, which is comprised of pure HCl is removed from the evaporator 24 through the stream 7 where it is directed ultimately to the absorber 30.

The solution or raffinate which exits from the evaporator 24 through the stream 8 is rich in acetophenone or other solvent, but also still contains the azeotropic composition of HCl and water. Specifically, this stream 8 contains approximately 5% HCl. In the preferred system, this composition also contains approximately 73% acetophenone, a small amount (about 2%) of glucose and about 20% water. Thus, the concentration of hydrochloric acid (concentration of HCl in water) in this composition is about 20%. This azeotropic solution, is then directed to a mixer/decanter or mixer/settler 28 for the purpose of further separating the acetophenone or other solvent from the HCl.

It should be noted that although acetophenone will dissolve HCl at concentrated levels of HCl, it is generally immiscible with HCl at lower concentrations. It has been determined that the concentration below which the HCl and acetophenone are immiscible is approximately 10%. To permit the HCl and acetophenone in the azeotropic stream 8 to be further separated, water is added to the mixer/decanter 28 through the stream 14. This causes dilution of the HCl to a level which allows the acetophenone and HCl in the mixer/decanter 28 to separate into a phase rich in HCl and a phase rich in acetophenone. In the preferred procedure, sufficient water is added via stream 14 to reduce the HCl concentration in the mixer/decanter 28 to about 10%. The phase containing the HCl is removed from the mixer/decanter 28 through the stream 15 where it is introduced into the absorber 30. In the preferred method this hydrochloric acid has a concentration of about 9%–10%. The acetophenone-rich phase is removed from the mixer/decanter 28 and is directed via the stream 11 to form part of the solvent recycle stream 13. This solvent recycle stream 13 is directed to the solvent holding tank 26 for reuse in the primary extraction procedure.

The glucose-rich raffinate phase which exits from the extraction column 22 is directed via the stream 6 to a vacuum evaporator 25. In the preferred procedure, evaporator 25 is operated at or slightly above room temperature and at a pressure of 50 mm. of mercury. The reason for operating this evaporator under vacuum conditions and at room temperature is because of the high level of sugar concentration in the raffinate phase. An increase in the temperature of this raffinate phase increases the degradation of sugars to their polymer form or to furan derivatives. In the preferred procedure, the raffinate phase which exits from the extraction column 22 has a composition of approximately 20% HCl, 60% water, 18% glucose and a small amount (about 2%) of acetophenone.

The HCl which is removed in the vacuum evaporator 25 is removed as HCl and water vapor via the stream 9. The composition of this stream 9 is determined by the azeotropic relationship between HCl and water. In the preferred procedure, stream 9 is directed to the absorber 30 for combination with the HCl streams 2 and 7.

The portion which is not removed in the evaporator 25 is taken off below through the stream 10. The composition of this stream is approximately 64% glucose, 20% water, 8% acetophenone and 8% HCl. Thus, the hydrochloric acid concentration (concentration of HCl in water) in stream 10 is about 29%.

This stream 10 is directed to a second mixer/decanter 29 for the purpose of further separating the sugars from the acetophenone. To accomplish this, water is added to the mixer/decanter 29 through the stream 18 so that the composition within the mixer/decanter 29 separates into a glucose-rich phase and a solvent or acetophenone phase. In the preferred procedure using acetephenone as the solvent, sufficient water must be added to reduce the concentration of acetophenone (relative to water) to less than 10%. This concentration will result in separation into an acetophenone phase and a glucose or sugar phase. It should also be noted that additional water can be added so as to control the output concentration of the sugars through stream 16.

The acetophenone, which separates almost completely from the remaining composition, is removed from the mixer/decanter 29 through the stream 12 where it joins with stream 11 to make up the solvent recycle stream 13. Because the composition of the glucose-rich phase in the mixer/decanter 29 still contains a small quantity of HCl, a neutralizing quantity of lime or other neutralizing agent is added via the stream 17 for the purpose of neutralizing the HCl. The resulting composition which is rich in glucose (approximately 10%) is then taken from the mixer/decanter 29 through the stream 16 as the main product.

The various streams of HCl or hydrochloric acid from the flash drum through stream 2, from the evaporator through stream 7, from the mixer/decanter 28 through stream 15 and from the evaporator 25 through the stream 9 are all directed into the absorber or absorption column 30 for the purpose of preparing the concentrated acid streams for reuse in the acid hydrolysis procedure. As indicated above, the streams 2 and 7 contain HCl gas, while streams 15 and 9 contain hydrochloric acid in the approximate concentrations of 10% and 25%, respectively. The absorber 30 is a conventional absorption column which can be utilized to produce hydrochloric acid of any concentration or concentrations desired. In the preferred procedure, the absorber 30 is used to prepare concentrations of 37% and 43% (which exit from the absorber 30 via the streams 20 and 19, respectively) for reuse in the acid hydrolysis of biomass.

Although the description of the preferred method has been quite specific, it is contemplated that various modifications could be made without deviating from the spirit of the present invention. Accordingly, it is intended that the present invention be dictated by the appended claims rather than by the description of the preferred embodiment.

We claim:

1. A method of recovering hydrochloric acid from the crude product obtained from the acid hydrolysis of a cellulose containing material, said method comprising the steps of:
   contacting the crude product with a solvent comprising acetophenone as a major component and separating said product into a hydrochloric acid enriched phase and a hydrochloric acid depleted phase; and
   separating and recovering the hydrochloric acid from the hydrochloric acid enriched phase.

2. The method of claim 1 including separating the solvent from the hydrochloric acid depleted phase.

3. The method of claim 2 wherein said contacting step is carried out in a countercurrent extraction column.

4. The method of claim 3 wherein the crude product is supplied to a first end of said extraction column and said solvent is supplied to a second end of said extraction column and wherein said hydrochloric acid enriched phase is removed from the first end of said extraction column and said hydrochloric acid depleted phase is removed from the second end of said extraction column.

5. The method of claim 1 including separating the hydrochloric acid from the hydrochloric acid enriched phase by evaporation.

6. The method of claim 5 wherein said evaporation is carried out at atmospheric pressure.

7. The method of claim 5 including further separating the hydrochloric acid from the raffinate of said evaporation step by exposing said raffinate to a mixer/decanter.

8. The method of claim 7 including adding water to the raffinate in said mixer/decanter in a quantity sufficient to reduce the concentration of hydrochloric acid to less than 10%.

9. The method of claim 2 including separating the hydrochloric acid from said hydrochloric acid depleted phase by evaporation.

10. The method of claim 9 wherein said evaporation is carried out at less than atmospheric pressure.

11. The method of claim 10 wherein said evaporation is carried out at approximately 25°–30° C.

12. The method of claim 9 including further separating the raffinate of said evaporation step by exposing said raffinate to a mixer/decanter.

13. The method of claim 12 including adding water to the raffinate in said mixer/decanter in a quantity sufficient to reduce the concentration of hydrochloric acid in said raffinate to less than 10%.

14. The method of claim 1 wherein said solvent is comprised of at least 50% acetophenone.

15. The method of claim 14 wherein said solvent is comprised of at least 75% acetophenone.

16. The method of claim 15 wherein said solvent consists essentially of acetophenone.

17. The method of claim 1 including separating said product into a hydrochloric acid enriched and sugar depleted phase and a hydrochloric acid depleted and sugar enriched phase.

18. The method of claim 1 comprising a method of recovering concentrations of hydrochloric acid in excess of about 10%.

* * * * *